United States Patent
Wang et al.

(10) Patent No.: US 11,402,269 B2
(45) Date of Patent: *Aug. 2, 2022

(54) ADVANCED FLUORESCENCE AND SYSTEMIC NOISE REDUCTION IN TIME-GATED SPECTROSCOPY

(71) Applicant: BioSpex, Inc., San Jose, CA (US)

(72) Inventors: Zhenyou Wang, Milpitas, CA (US); Wei Yang, Los Altos Hills, CA (US)

(73) Assignee: BioSpex, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,825

(22) Filed: Aug. 26, 2020

(65) Prior Publication Data

US 2020/0393299 A1 Dec. 17, 2020

Related U.S. Application Data

(63) Continuation of application No. 16/289,596, filed on Feb. 28, 2019, now Pat. No. 10,760,969.

(51) Int. Cl.
*G01J 3/44* (2006.01)
*G01N 21/65* (2006.01)

(52) U.S. Cl.
CPC ............ *G01J 3/4412* (2013.01); *G01N 21/65* (2013.01); *G01J 2003/4424* (2013.01); *G01N 2201/127* (2013.01); *G01N 2201/129* (2013.01)

(58) Field of Classification Search
CPC .... G01J 3/44; G01J 3/4412; G01J 2003/4424; G01N 21/65; G01N 2201/127; G01N 2201/129
See application file for complete search history.

(56) References Cited

U.S. PATENT DOCUMENTS

| 4,722,604 A | 2/1988 | French et al. |
| 4,988,190 A | 1/1991 | Miles |

(Continued)

FOREIGN PATENT DOCUMENTS

| AT | 1103 U1 * 10/1996 | ............ F02B 77/085 |
| CN | 107505306 A * 12/2017 | ................ G01J 3/44 |

(Continued)

OTHER PUBLICATIONS

Cooper, John B. et al., "Sequentially Shifted Excitation Raman Spectroscopy: Novel Algorithm and Instrumentation for Fluorescence-Free Raman Spectroscopy in Spectral Space", Society for Applied Spectroscopy, vol. 67, No. 8, 2013, pp. 973-984.

(Continued)

*Primary Examiner* — Tarifur R Chowdhury
*Assistant Examiner* — Jonathon Cook
(74) *Attorney, Agent, or Firm* — Carr & Ferrell LLP

(57) ABSTRACT

Systems and methods for reducing fluorescence and systematic noise in time-gated spectroscopy are disclosed. Exemplary methods include: a method for reducing fluorescence and systematic noise in time-gated spectroscopy may comprise: providing first light using an excitation light source; receiving, by a detector, first scattered light from a material responsive to the first light during a first time window; detecting a peak intensity of the first scattered light; receiving, by the detector, second scattered light from the material responsive to the first light during a second time window; detecting a peak intensity of the second scattered light; recovering a spectrum of the material by taking a ratio of the peak intensity of the first scattered light and the peak intensity of the second scattered light; and identifying at least one molecule of the material using the recovered spectrum and a database of identified spectra.

20 Claims, 11 Drawing Sheets

(56) References Cited

U.S. PATENT DOCUMENTS

| | | |
|---|---|---|
| 5,615,673 A | 4/1997 | Berger et al. |
| 5,628,310 A | 5/1997 | Rao et al. |
| 5,991,653 A * | 11/1999 | Richards-Kortum ........................ A61B 5/0059 250/339.01 |
| 6,011,984 A | 1/2000 | Van Antwerp et al. |
| 6,366,793 B1 | 4/2002 | Bell et al. |
| 6,631,282 B2 | 10/2003 | Rule et al. |
| 6,665,556 B1 | 12/2003 | Alfano et al. |
| 6,763,047 B2 | 7/2004 | Daiber et al. |
| 6,766,183 B2 | 7/2004 | Walsh et al. |
| 6,853,452 B1 | 2/2005 | Laufer |
| 7,102,746 B2 | 9/2006 | Zhao |
| 7,647,092 B2 | 1/2010 | Motz et al. |
| 8,072,595 B1 | 12/2011 | Bastiaans et al. |
| 8,325,337 B2 | 12/2012 | Sinfield et al. |
| 8,570,507 B1 | 10/2013 | Cooper et al. |
| 8,873,041 B1 | 10/2014 | Chai et al. |
| 9,462,255 B1 | 10/2016 | Marason et al. |
| 9,494,466 B2 * | 11/2016 | Uchii ..................... G01J 5/602 |
| 9,554,738 B1 | 1/2017 | Gulati et al. |
| 10,253,346 B2 | 4/2019 | Auner et al. |
| 10,317,281 B2 | 6/2019 | Wang et al. |
| 10,408,760 B2 | 9/2019 | Wang et al. |
| 10,416,081 B2 | 9/2019 | Sumpf et al. |
| 10,548,481 B2 | 2/2020 | Yang et al. |
| 10,760,969 B1 | 9/2020 | Wang et al. |
| 10,794,766 B2 | 10/2020 | Sumpf et al. |
| 10,876,892 B2 | 12/2020 | Yang et al. |
| 10,881,301 B2 | 1/2021 | Periaki et al. |
| 11,035,797 B2 | 6/2021 | Yang et al. |
| 11,326,944 B2 | 5/2022 | Yang et al. |
| 2003/0059820 A1 | 3/2003 | Vo-Dinh |
| 2003/0234932 A1 | 12/2003 | Nicolaides et al. |
| 2004/0180379 A1 | 9/2004 | Van Duyne et al. |
| 2004/0223881 A1 | 11/2004 | Cunningham et al. |
| 2005/0027176 A1 | 2/2005 | Xie |
| 2005/0043597 A1 | 2/2005 | Xie |
| 2005/0057749 A1 | 3/2005 | Dietz et al. |
| 2006/0114312 A1 | 6/2006 | Shiraishi |
| 2007/0004975 A1 | 1/2007 | Zribi et al. |
| 2007/0165236 A1 | 7/2007 | Haridas |
| 2007/0252978 A1 | 11/2007 | Van Der Voort et al. |
| 2008/0030726 A1 | 2/2008 | Flanders et al. |
| 2008/0030728 A1 | 2/2008 | Nguyen |
| 2008/0091064 A1 | 4/2008 | Laser |
| 2008/0129992 A1 | 6/2008 | Matousek et al. |
| 2008/0198365 A1 | 8/2008 | Treado et al. |
| 2008/0214913 A1 | 9/2008 | Van Gogh et al. |
| 2009/0046289 A1 | 2/2009 | Caldwell et al. |
| 2009/0105605 A1 | 4/2009 | Abreu |
| 2011/0122407 A1 | 5/2011 | Jalali et al. |
| 2011/0275932 A1 | 11/2011 | Leblond et al. |
| 2012/0026483 A1 | 2/2012 | Messerchmidt |
| 2012/0035442 A1 | 2/2012 | Barman et al. |
| 2012/0099102 A1 | 4/2012 | Bello |
| 2012/0231447 A1 | 9/2012 | Zhang et al. |
| 2012/0287428 A1 | 11/2012 | Tamada |
| 2012/0309080 A1 | 12/2012 | Cunningham et al. |
| 2013/0018237 A1 | 1/2013 | Henneberg et al. |
| 2013/0147766 A1 | 6/2013 | Chen et al. |
| 2013/0342835 A1 | 12/2013 | Blacksberg |
| 2014/0268050 A1 | 9/2014 | Jayaraman |
| 2015/0233836 A1 | 8/2015 | Okumura et al. |
| 2015/0342508 A1 | 12/2015 | Chong |
| 2016/0061660 A1 | 3/2016 | Kim |
| 2016/0354015 A1 | 12/2016 | Zhang et al. |
| 2017/0059412 A1 | 3/2017 | Ye et al. |
| 2017/0062636 A1 | 3/2017 | Ram et al. |
| 2017/0074732 A1 * | 3/2017 | Marsh ........................ G01L 1/24 |
| 2017/0108439 A1 | 4/2017 | Stievater et al. |
| 2017/0173262 A1 | 6/2017 | Veltz |
| 2017/0316487 A1 | 11/2017 | Mazed |
| 2018/0042527 A1 | 2/2018 | Rawicz et al. |
| 2018/0106900 A1 | 4/2018 | Droz |
| 2018/0164218 A1 | 6/2018 | Zavaleta et al. |
| 2018/0299355 A1 | 10/2018 | Young et al. |
| 2018/0310827 A1 | 11/2018 | Yang et al. |
| 2018/0313692 A1 | 11/2018 | Yang et al. |
| 2019/0015023 A1 | 1/2019 | Monfre |
| 2019/0128934 A1 | 5/2019 | Park et al. |
| 2019/0154584 A1 | 5/2019 | Ahn et al. |
| 2019/0195688 A1 | 6/2019 | Atabaki et al. |
| 2019/0274759 A1 | 9/2019 | Royon |
| 2019/0370447 A1 | 12/2019 | Houck et al. |
| 2020/0041414 A1 | 2/2020 | Münzer |
| 2020/0124535 A1 | 4/2020 | Yang et al. |
| 2020/0278255 A1 | 9/2020 | Wang et al. |
| 2020/0352444 A1 | 11/2020 | Periaki et al. |
| 2021/0010861 A1 | 1/2021 | Yang et al. |
| 2021/0010865 A1 | 1/2021 | Yang et al. |
| 2021/0048342 A1 | 2/2021 | Kim et al. |
| 2021/0116303 A1 | 4/2021 | Yang et al. |
| 2021/0148756 A1 | 5/2021 | Bouchard |

FOREIGN PATENT DOCUMENTS

| | | | |
|---|---|---|---|
| EP | 0474264 A2 * | 3/1992 | ............ G01S 7/4811 |
| EP | 2806263 A1 * | 11/2014 | ......... B01D 53/1475 |
| WO | WO-2018055357 A1 * | 3/2018 | ................ G01J 3/00 |
| WO | WO-2018102467 A1 * | 6/2018 | ............ G01J 3/0237 |

OTHER PUBLICATIONS

Kostamovaara, J. et al., "Fluorescence suppression in Raman spectroscopy using a time-gated CMOS SPAD," Optics Express, Optics Society of America, vol. 21, No. 25, Dec. 13, 2013, 14 pages.

Nissinen, I. et al., "On the effects of the time gate position and width on the signal-to-noise ratio for detection of Raman spectrum in a time-gated CMOS single-photon avalanche diode based sensor," El Sevier, Sensors and Actuators B: Chemical, vol. 241, Mar. 31, 2017, pp. 1145-1152.

Kabuss, Julia et al., "Theory of time-resolved Raman scattering and fluorescence emission from semiconductor quantum dots", The American Physical Society, Physical Review B 81, 075314 (2010), Feb. 18, 2010.

* cited by examiner

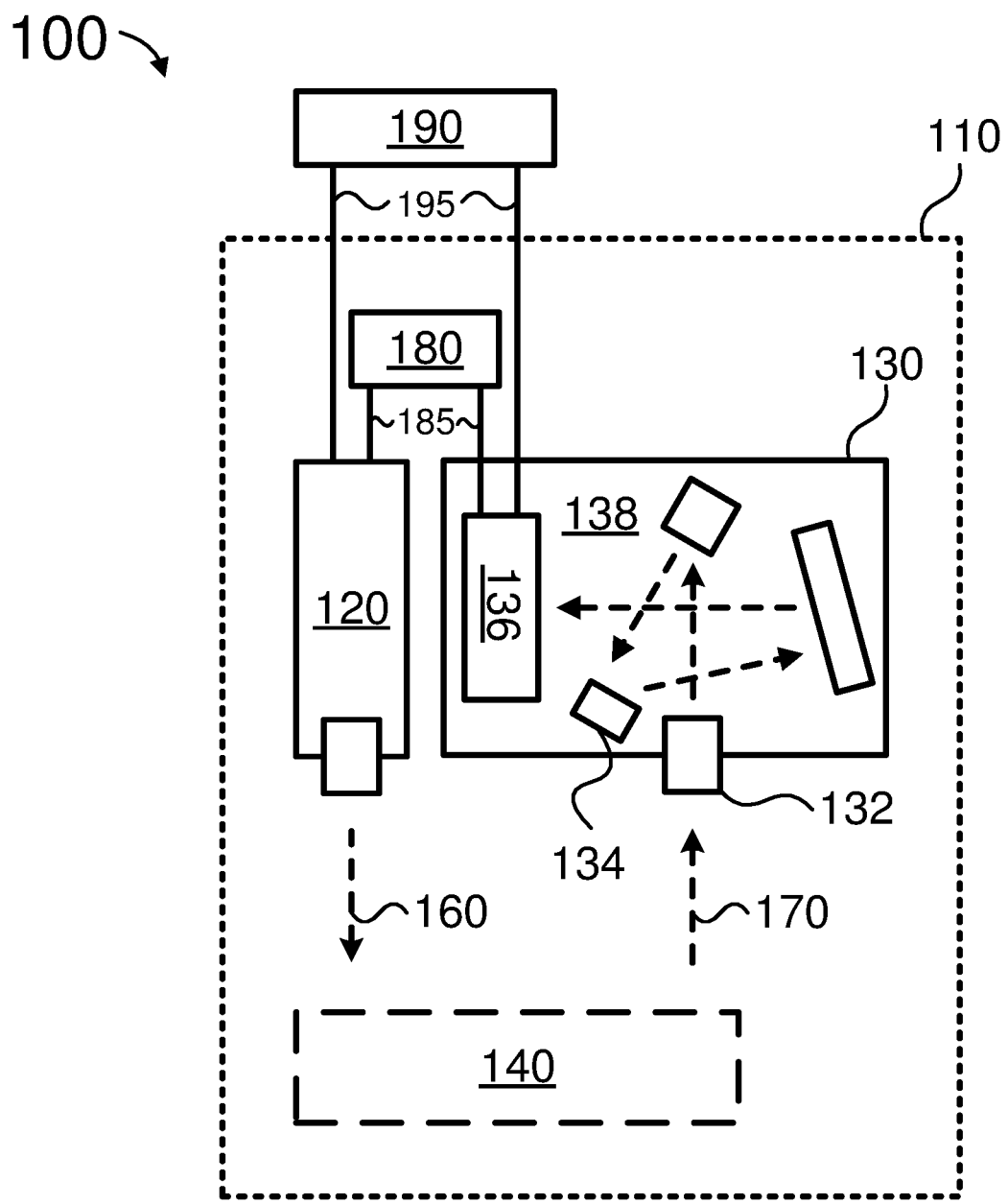
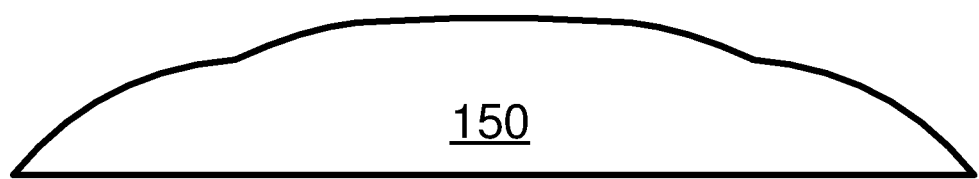
FIG. 1

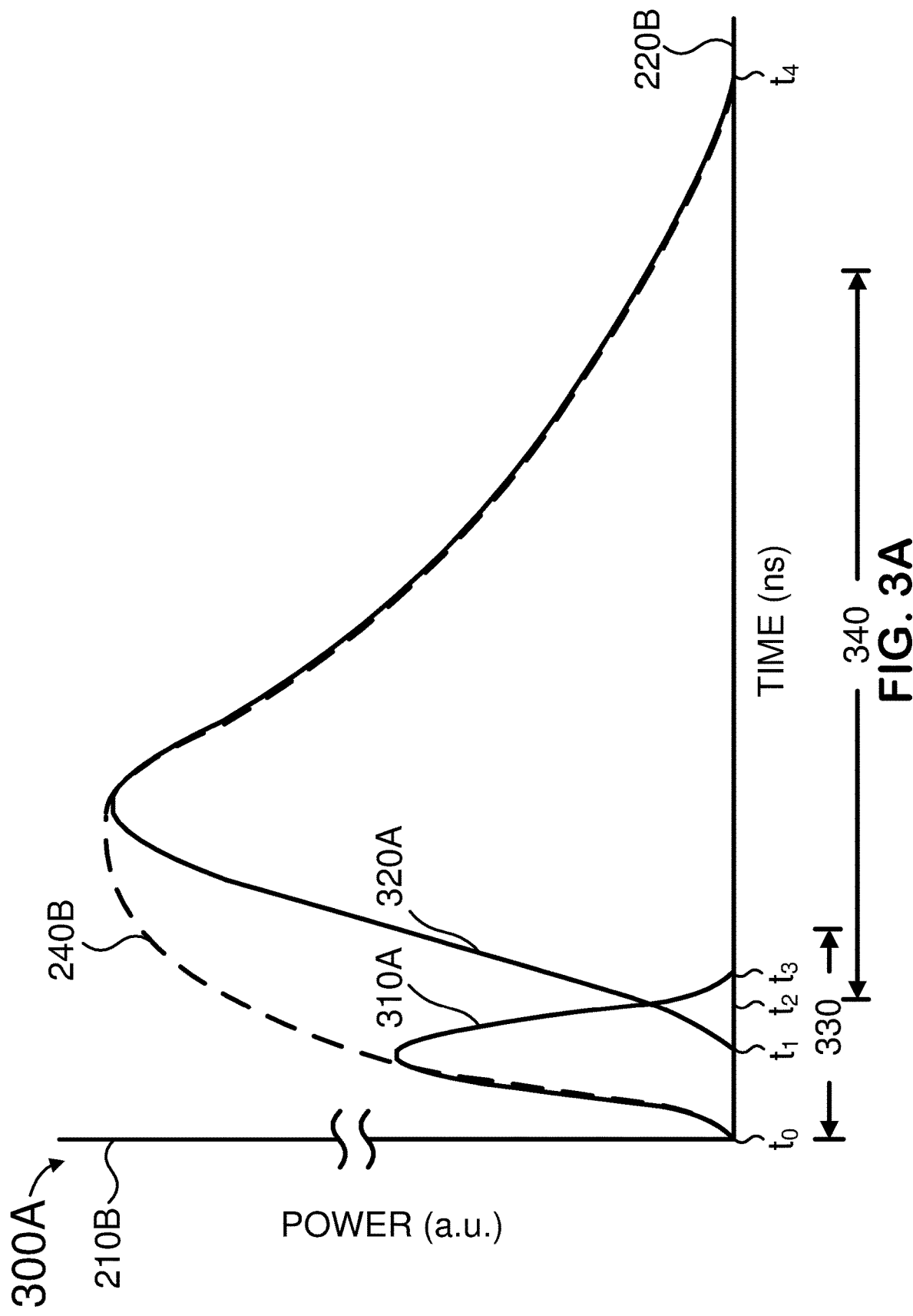

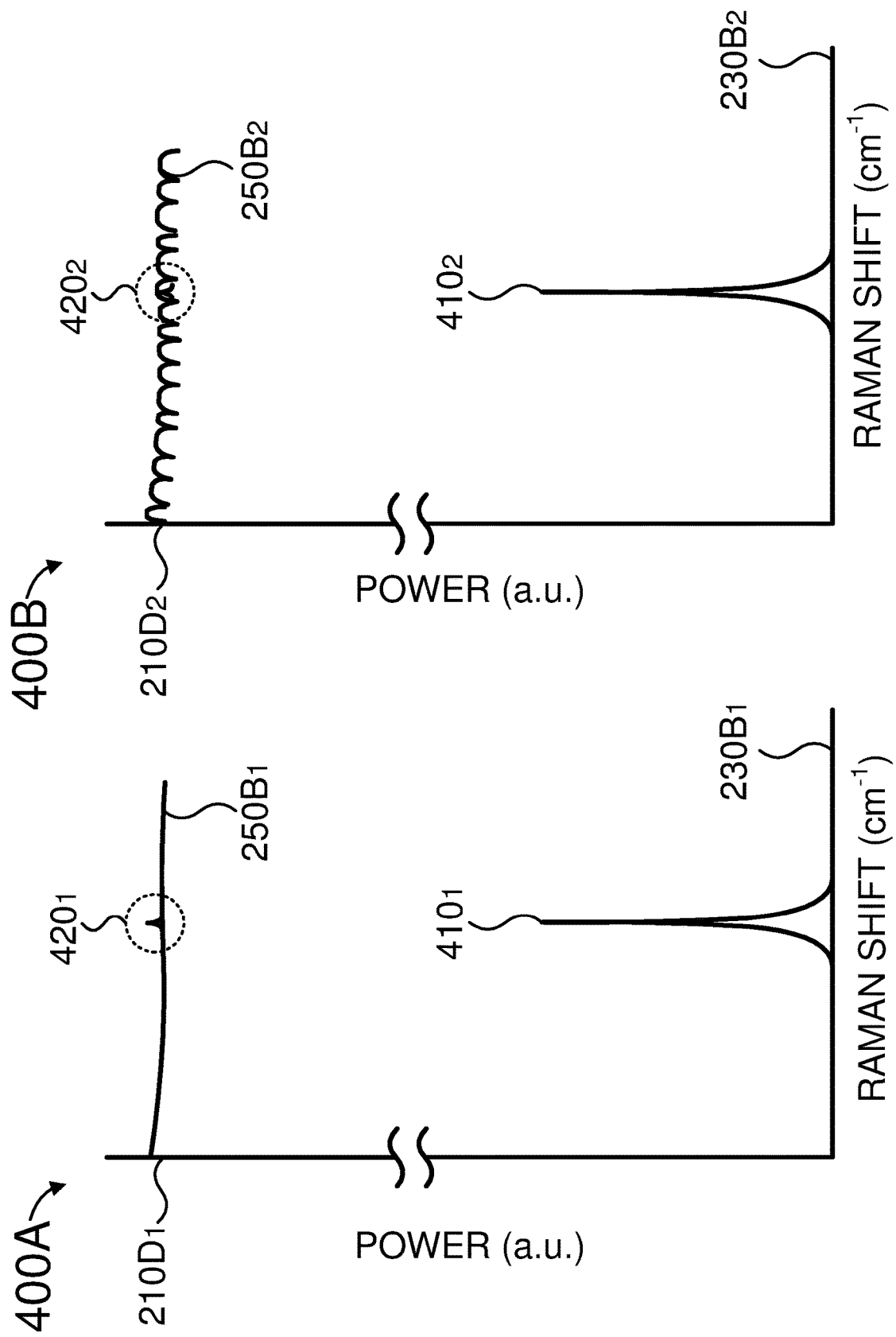

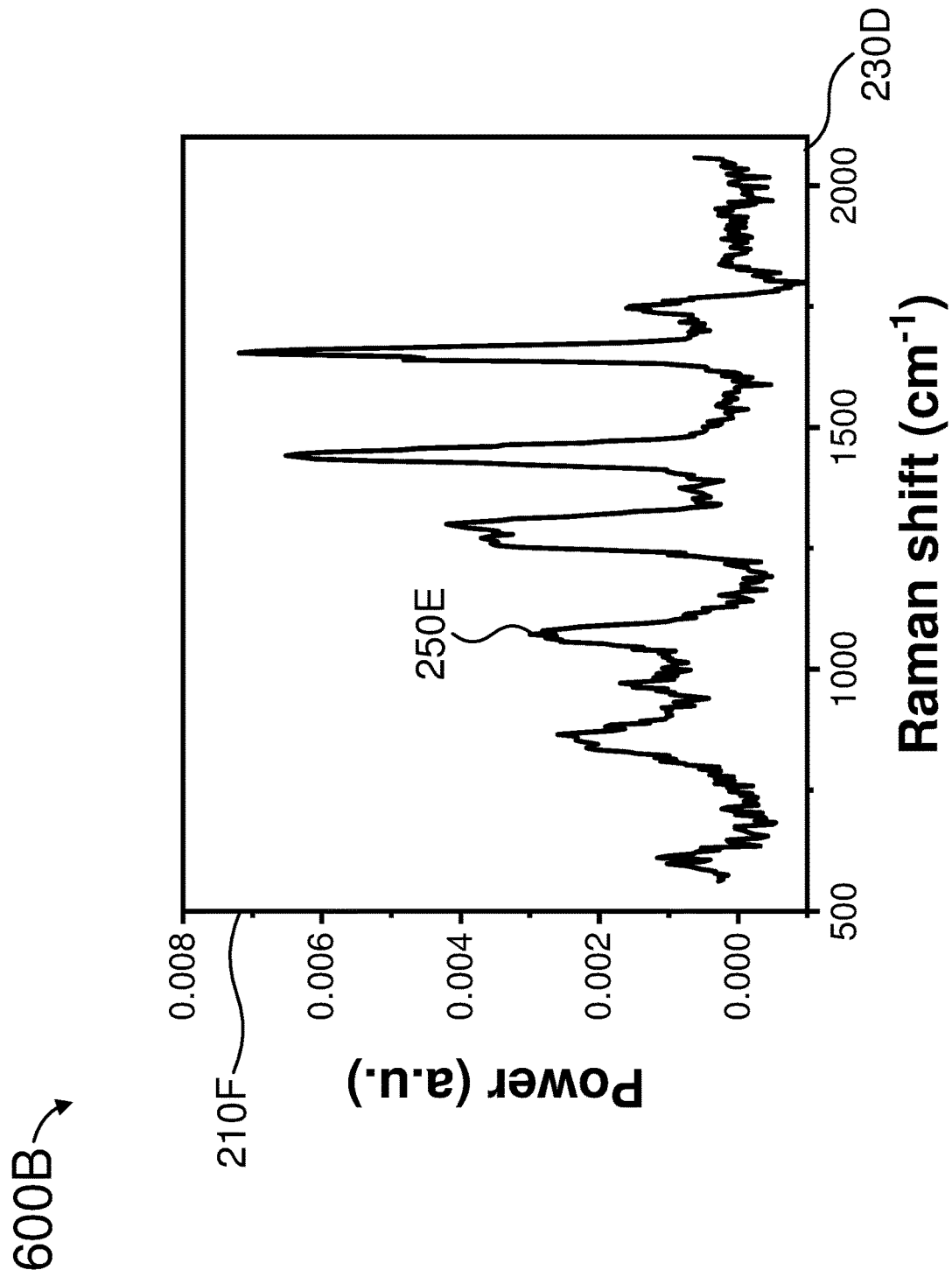

ADVANCED FLUORESCENCE AND SYSTEMIC NOISE REDUCTION IN TIME-GATED SPECTROSCOPY

CROSS-REFERENCE TO RELATED APPLICATIONS

The present continuation application claims the priority benefit of U.S. Non-Provisional patent application Ser. No. 16/289,596 filed on Feb. 28, 2019 and titled "Fluorescence and Systemic Noise Reduction in Time-Gated Spectroscopy," which is hereby incorporated by reference in its entirety.

TECHNICAL FIELD

The present technology relates generally to spectral imaging, and more specifically to time-resolved spectroscopy.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Spectroscopy (or spectrography) refers to techniques that employ radiation in order to obtain data on the structure and properties of matter. Spectroscopy involves measuring and interpreting spectra that arise from the interaction of electromagnetic radiation (e.g., a form of energy propagated in the form of electromagnetic waves) with matter. Spectroscopy is concerned with the absorption, emission, or scattering of electromagnetic radiation by atoms or molecules.

Spectroscopy can include shining a beam of electromagnetic radiation onto a desired sample in order to observe how it responds to such stimulus. The response can be recorded as a function of radiation wavelength, and a plot of such responses can represent a spectrum. The energy of light (e.g., from low-energy radio waves to high-energy gamma-rays) can result in producing a spectrum.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for fluorescence and systemic noise reduction in time-gated spectroscopy. Specifically, a method for reducing fluorescence and systematic noise in time-gated spectroscopy may comprise: providing first light using an excitation light source; receiving, by a detector, first scattered light from a material responsive to the first light during a first time window having a first duration, the first scattered light having substantial Raman signal, the first scattered light having a first wavelength; detecting a peak intensity of the first scattered light; receiving, by the detector, second scattered light from the material responsive to the first light during a second time window having a second duration, the second scattered light having little Raman signal, the second scattered light having the first wavelength; detecting a peak intensity of the second scattered light; providing second light using the excitation light source; receiving, by the detector, third scattered light from the material responsive to the second light during a third time window having the first duration, the third scattered light having substantial Raman signal, the third scattered light having a second wavelength; detecting a peak intensity of the third scattered light; receiving, by the detector, fourth scattered light from the material responsive to the second light during a fourth time window having the second duration, the fourth scattered light having little Raman signal, the fourth scattered light having the second wavelength; detecting a peak intensity of the fourth scattered light; recovering a spectrum of the material by taking a ratio of the peak intensity of the first scattered light and the peak intensity of the second scattered light, and taking a ratio of the peak intensity of the third scattered light and the peak intensity of the fourth scattered light; and identifying at least one molecule of the material using the recovered spectrum and a database of identified spectra.

BRIEF DESCRIPTION OF THE DRAWINGS

Embodiments are illustrated by way of example, and not by limitation, in the figures of the accompanying drawings, in which like references indicate similar elements and in which:

FIG. 1 is a simplified representation of a system for fluorescence and systematic noise reduction in time-gated spectroscopy, according to some embodiments.

FIGS. 3A and 3B illustrate fluorescence, in accordance with some embodiments.

FIG. 4 illustrates fluorescence and systematic noise, in accordance with various embodiments.

FIGS. 6A and 6B are simplified representations of spectra with fluorescence and systematic noise removed, according to various embodiments.

DETAILED DESCRIPTION

Figure 2:
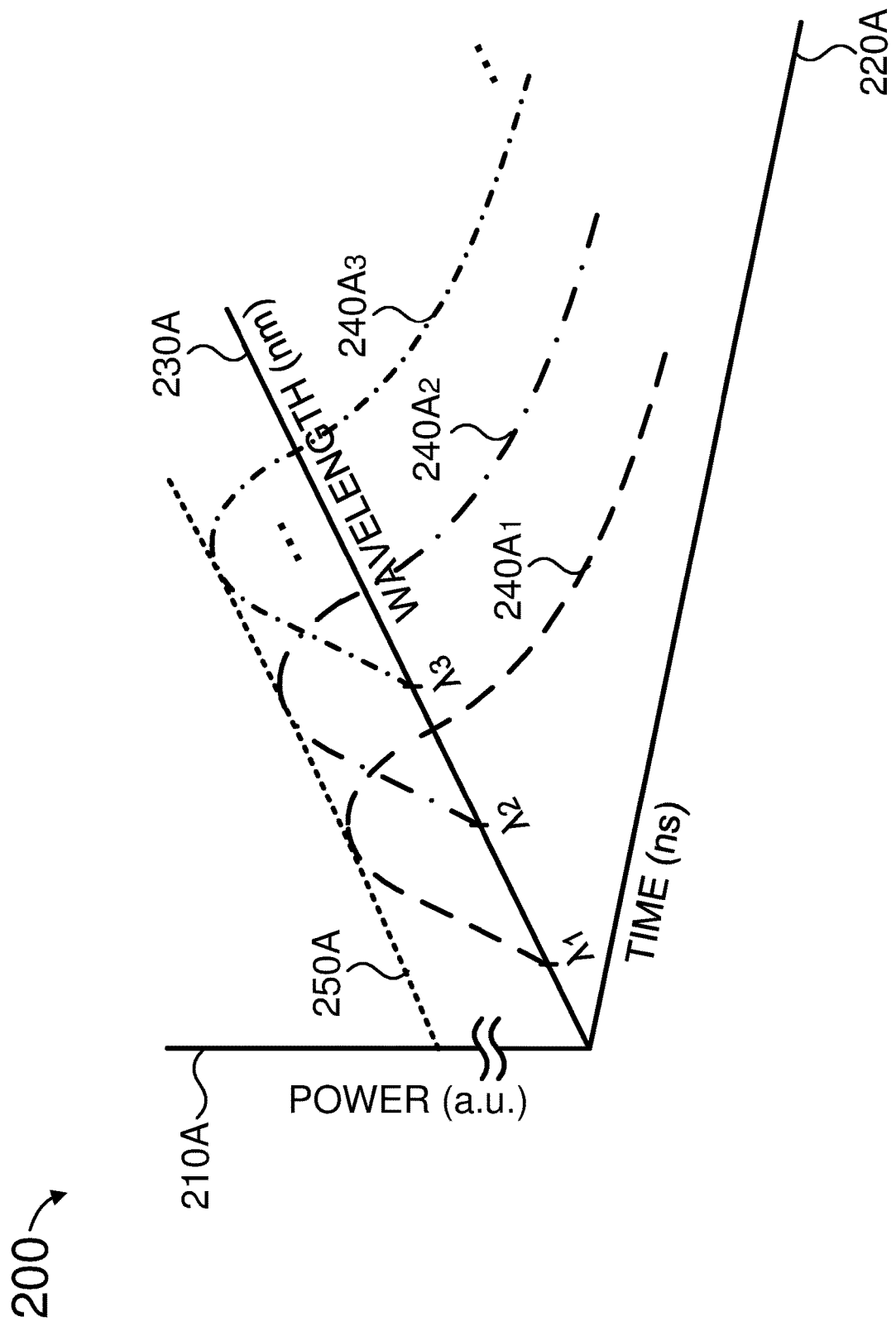
FIG. 2 is a simplified representation of a spectrum, according to various embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 illustrates system 100 for fluorescence and systematic noise reduction according to some embodiments. System 100 can include spectrometer 110, material 150, and computing system 190.

According to some embodiments, material 150 is at least one of solid, liquid, plant tissue, human tissue, and animal tissue. Generally, material 150 has fluorescence or phosphorescence background emissions when illuminated by spectrometer 110. For example, animal tissue is one or more of epithelial, nerve, connective, muscle, and vascular tissues. By way of further non-limiting example, plant tissue is one or more of meristematic (e.g., apical meristem and cambium), protective (e.g., epidermis and cork), fundamental (e.g., parenchyma, collenchyma and sclerenchyma), and vascular (e.g., xylem and phloem) tissues.

According to some embodiments, spectrometer 110 comprises excitation light source 120, optical bench 130, optional sampling apparatus 140, and delay 180. Excitation light source 120 is a monochromatic light source, such as a laser, in accordance with some embodiments. For example, excitation light source 120 is at least one of an Nd:YAG (neodymium-doped yttrium aluminum garnet; Nd:Y3Al5O12), Argon-ion, He—Ne, and diode laser. By way of further non-limiting example, excitation light source 120 can provide light (electromagnetic waves) in a range between ultra-violet (UV) light (e.g., electromagnetic radiation with a wavelength from 10 nm to 400 nm) and short-wave near-infrared (NIR) (1.4 μm to 3 μm), including portions of the electromagnetic spectrum in-between, such as visible light (e.g., 380 nm-760 nm) and NIR light (e.g., 0.75 μm to 1.4 μm).

In various embodiments, excitation light source 120 is tunable—a wavelength of the light from excitation light source 120 is changed by one or more (predetermined) increments and/or to one or more (predetermined) values—such as by using heat control (e.g., from a heating element), electrical control (e.g., using microelectromechanical systems (MEMS)), and mechanical control (e.g., using a mechanism to turn a mirror). Preferably, excitation light source 120 provides high spectral purity, high wavelength stability, and/or high power stability output.

Optional sampling apparatus 140 performs various combinations and permutations of directing light 160 from excitation light source 120, collecting the resulting Raman scattered light or Raman scatter (among others) 170, filtering out radiation at the wavelength corresponding to the laser line (e.g., Rayleigh scattering), and providing the Raman scatter (among others) 170 to optical bench 130, according to some embodiments. For example, optional sampling apparatus 140 includes a microscope and/or an optical probe. By way of further non-limiting example, optional sampling apparatus 140 includes optical fiber, one or more filters (e.g., notch filter, edge-pass filter, and band-pass filter), and the like. Raman scatter (among others) 170 includes, for example, at least one of Raman scatter, fluorescence, and Rayleigh scattering (which can be filtered out by sampling apparatus 140).

In accordance with some embodiments, optical bench 130 is a spectrograph. For example, optical bench 130 includes slit 132, spectral dispersion element 134, and detector 136. By way of non-limiting example, optical bench 130 measures wavelengths in one or more of the UV spectrum (10 nm to 400 nm), visible spectrum (e.g., 380 nm-760 nm), visible to near-infrared (e.g., 400 nm-1000 nm), short-wave infrared (e.g., 950 nm-1700 nm), and infrared (e.g., 1 μm-5 μm).

Slit 132, spectral dispersion element 134, and detector 136 can be arranged in optical bench 138, along with other components (e.g., monochromater—which transmits a mechanically selectable narrow band of wavelengths of light or other radiation chosen from a wider range of wavelengths available at an input—including one or more of a mirror, prism, collimater, holographic grating, diffraction grating, blazed grating, and the like), according to different configurations. For example, different configurations include: crossed Czerny-Turner, unfolded Czerny-Turner, transmission, and concave holographic optical benches.

Slit 132 can determine the amount of light (e.g., photon flux, such as Raman scatter (among others) 170) that enters optical bench 138. Dimensions (e.g., height and width, not shown in FIG. 1) of slit 132 can determine the spectral resolution of optical bench 130. By way of non-limiting example, a height of slit 132 can range from 1 mm to 20 mm. By way of further non-limiting example, a width of slit 132 can range from 5 μm to 800 μm.

Spectral dispersion element 134 can determine a wavelength range of optical bench 130 and can partially determine an optical resolution of optical bench 130. For example, spectral dispersion element 134 is a ruled diffraction grating or a holographic diffraction grating, in the form of a reflective or transmission package. Spectral dispersion element 134 can include a groove frequency and a blaze angle.

Detector 136 receives light and measures the intensity of scattered light. Detector 136 can be a one- or two-dimensional detector array comprised of a semiconductor material such as silicon (Si) and indium gallium arsenide (InGaAs). In some embodiments, a bandgap energy of the semiconductor determines an upper wavelength limit of detector 136. An array of detector 136 can be in different configurations, such as charged coupled devices (CCDs), back-thinned charge coupled devices (BT-CCDs), complementary metal-oxide-semiconductor (CMOS) devices, and photo-diode arrays (PDAs). CCDs can be one or more of intensified CCDs (ICCDs) with photocathodes, back illuminated CCDs, and CCDs with light enhancing coatings (e.g., Lumogen® from BASF®). Detector 136 has a resolution of 8-15 wavenumbers, according to some embodiments. Detector 136 can be used to detect concentrations of molecules in the range of 1-1,000 mg per deciliter (mg/dL).

By way of further non-limiting example, detector 136 is a single pixel time-gated detector such as single-photon avalanche diode (SPAD), micro-channel plate (MCP), photomultiplier tube (PMT), silicon photomultiplier (SiPM), or avalanche photodiode (APD) that sits on a scanning motor driven rail, or detector arrays such as a single-photon avalanche diode (SPAD) array, or an intensified CCD (ICCD). A SPAD is a solid-state photodetector in which a photon-generated carrier (via the internal photoelectric effect) can trigger a short-duration but relatively large avalanche current. The leading edge of the avalanche pulse marks the arrival (time) of the detected photon. The avalanche current can continue until the avalanche is quenched (e.g., by lowering a bias voltage down to a breakdown voltage). According to various embodiments, each pixel in some SPAD arrays can count a single photon and the SPAD array can provide a digital output (e.g., a 1 or 0 to denote the presence or absence of a photon for each pixel).

To detect another photon, a control circuit(s) (not depicted in FIG. 1) integrated in and/or external to the SPAD can be used to read out measurements and quench the SPAD. For example, the control circuit can sense the leading edge of the avalanche current, generate a (standard) output pulse synchronous with the avalanche build up, quench the avalanche, and restore the diode to an operative level. The control circuit can provide passive quenching (e.g., passive quenching passive reset (PQPR), passive quench active reset (PQAR), and the like) and/or active quenching (e.g., active quench active reset (AQAR), active quenching passive reset (AQPR), and the like). In various embodiments, detector 136A is a complementary metal-oxide semiconductor (CMOS) SPAD array.

A micro-channel plate (MCP) is a planar component used for detection of single particles, such as photons. An MCP can intensify photons by the multiplication of electrons via secondary emission. Since a microchannel plate detector has many separate channels, it can also provide spatial resolution.

A photomultiplier tube (PMT) is a photoemissive device which can detect weak light signals. In a PMT, absorption of a photon results in the emission of an electron, where the electrons generated by a photocathode exposed to a photon flux are amplified. A PMT can acquire light through a glass or quartz window that covers a photosensitive surface, called a photocathode, which then releases electrons that are multiplied by electrodes known as metal channel dynodes. At the end of the dynode chain is an anode or collection electrode. Over a very large range, the current flowing from the anode to ground is directly proportional to the photoelectron flux generated by the photocathode.

Silicon photomultipliers (SiPM) are solid-state single-photon-sensitive devices based on Single-photon avalanche diode (SPAD) implemented on a common silicon substrate. Each SPAD in an SiPM can be coupled with the others by a metal or polysilicon quenching resistor.

Avalanche photodiodes (APDs) are semiconductor photodiodes with an internal gain mechanism. In an APD, absorption of incident photons creates electron-hole pairs. A high reverse bias voltage creates a strong internal electric field, which accelerates the electrons through the semiconductor crystal lattice and produces secondary electrons by impact ionization. The resulting electron avalanche can produce gain factors up to several hundred.

An intensified charge-coupled device (ICCD) is a CCD that is optically connected to an image intensifier that is mounted in front of the CCD. An image intensifier can include three functional elements: a photocathode, a microchannel plate (MCP) and a phosphor screen. These three elements can be mounted one close behind the other. The photons which are coming from the light source fall onto the photocathode, thereby generating photoelectrons. The photoelectrons are accelerated towards the MCP by an electrical control voltage, applied between photocathode and MCP. The electrons are multiplied inside of the MCP and thereafter accelerated towards the phosphor screen. The phosphor screen converts the multiplied electrons back to photons which are guided to the CCD by a fiber optic or a lens. An image intensifier inherently includes shutter functionality. For example, when the control voltage between the photocathode and the MCP is reversed, the emitted photoelectrons are not accelerated towards the MCP but return to the photocathode. In this way, no electrons are multiplied and emitted by the MCP, no electrons are going to the phosphor screen, and no light is emitted from the image intensifier. In this case no light falls onto the CCD, which means that the shutter is closed.

Detector 136 can be other photodetectors having a time resolution of about one nanosecond or less. By way of further non-limiting example, detector 136 is a streak camera array, which can have a time-resolution of around 180 femtoseconds. A streak camera measures the variation in a pulse of light's intensity with time. A streak camera can transform the time variations of a light pulse into a spatial profile on a detector, by causing a time-varying deflection of the light across the width of the detector.

A spectral resolution of a spectrum measured by detector 136 can depend on the number of pixels (e.g., discrete photodetectors) in detector 136. A greater number of pixels can provide a higher spectral resolution. Detector 136 can comprise a one-dimensional and/or two-dimensional array of pixels. For example, detector 136 has in a range of 32 to 1,048,576 pixels. According to some embodiments, detector 136 has in a range of 512 to 1,024 pixels.

In some embodiments, the output (e.g., measurements) from detector 136 is provided to an analog-to-digital converter (ADC) (not shown in FIG. 1). The ADC can be integrated into detector 136 or separate from detector 136, such as in at least one of optical bench 130, spectrometer 110, and computing system 190. The ADC can convert the measurements before the next measurements are received. For example, when measurements are received at 20 kHz, the ADC can convert at 20 kHz or faster. When the output of detector 136 is already a digital spectra, analog-to-digital conversion is not needed.

Spectrometer 110 can provide information about molecular vibrations to identify and quantify characteristics (e.g., molecules) of material 150. Spectrometer 110 can direct light (electromagnetic waves) 160 from excitation light source 120 (optionally through optional sampling apparatus 140) onto material 150. Light 160 from excitation light source 120 can be said to be shone on material 150 and/or material 150 can be said to be illuminated by excitation light source 120 and/or light 160. When (incident) light from excitation light source 120 hits material 150, the (incident) light scatters. A majority (e.g., 99.999999%) of the scattered light is the same frequency as the light from excitation light source 120 (e.g., Rayleigh or elastic scattering).

A small amount of the scattered light (e.g., on the order of $10^{-6}$ to $10^{-8}$ of the intensity of the (incident) light from excitation light source 120) is shifted in energy from the frequency of light 160 from excitation light source 120. The shift is due to interactions between (incident) light 160 from excitation light source 120 and the vibrational energy levels of molecules in material 150. (Incident) Light 160 interacts with molecular vibrations, phonons, or other excitations in material 150, causing the energy of the photons (of light 160 from excitation light source 120) to shift up or down (e.g., Raman or inelastic scattering). The shift in energy (e.g., of Raman scatter 170 from material 150) can be used to identify and quantify characteristics (e.g., molecules) of material 150.

Optical bench 130 detects (an intensity of) the Raman scatter 170 using detector 136 (optionally received through optional sampling apparatus 140).

Spectrometer 110 can further include delay 180 for gating, according to some embodiments. Delay 180 can be communicatively coupled to excitation light source 120 and detector 136 through communications 185. In various embodiments, delay 180 can detect when excitation light source 120 provides light 160 (e.g., a laser pulse is emitted).

For example, delay 180 can have a sensor (not depicted in FIG. 1) which detects light 160 being emitted from excitation light source 120. By way of further non-limiting example, excitation light source 120 can provide a (electronic) signal to delay 180 when excitation light source 120 provides light 160 (e.g., fires laser pulse). A predetermined amount of time after light 160 is detected/signaled, delay 180 can provide a signal indicating to detector 136 to (effectively) stop detecting and provide measurements (e.g., report a photon count at that time). The predetermined amount of time can be a gate (e.g., time window 330 and time window 340 in FIG. 3A). For example, the predetermined amount of time (e.g., gate or time window) can be selected using the duration of light 160 (e.g., a laser pulse), characteristics of the material being measured (e.g., duration/lifetime of fluorescence), and the like.

Delay 180 can be an (programmable) analog (e.g., continuous time) and/or digital (e.g., discrete time) delay line. In some embodiments, delay 180 is a network of electrical components connected in series, where each individual element creates a time difference between its input signal and its output signal. In various embodiments, delay 180 comprises one or more delay elements (e.g., forming a (circular) buffer) such as in discrete logic (e.g., flip flops, inverters, digital (or voltage) buffer, and the like), (general purpose) microprocessor, digital signal processor, application specific standard product (ASSP), application-specific integrated circuit (ASIC), field-programmable gate array (FPGA), and the like. Although depicted as a part of spectrometer 110, delay 180 can alternatively be external to spectrometer 110, such as part of computing system 190.

Spectrometer 110 can be communicatively coupled to computing system 190 through communications 195. Communications 195 can be various combinations and permutations of wired and wireless communications (e.g., networks) described below in relation to FIG. 9. Computing system 190 can include a database of Raman spectra associated with known molecules and/or remotely access the database over a communications network (not shown in FIG. 1). In some embodiments, computing system receives intensity measurements from spectrometer 110, produces at least one Raman spectrum using data (e.g., intensity measurements) from spectrometer 110, and identifies and/or quantifies molecules in material 150 using the at least one Raman spectrum and a database of Raman spectra associated with known molecules.

In some embodiments, computing system 190 is a single computing device. For example, computing system 190 is a desktop or notebook computer communicatively coupled to Spectrometer 110 through a Universal Serial Bus (USB) connection, a WiFi connection, and the like.

In various embodiments, computing system 190 can be various combinations and permutations of stand-alone computers (e.g., smart phone, phablet, tablet computer, notebook computer, desktop computer, etc.) and resources in a cloud-based computing environment. For example, computing system 190 is a smart phone and a cloud-based computing system. The smart phone can receive data (e.g., intensity measurements) from spectrometer 110 using USB, WiFi, Bluetooth, and the like. The smart phone can optionally produce at least one Raman spectrum (e.g., including the Raman signal and fluorescence, for each excitation wavelength) using the data. The smart phone can transmit the data and/or at least one Raman spectrum to a cloud-based computing system over the Internet using a wireless network (e.g., cellular network). The cloud-based computing system can produce at least one Raman spectrum using the data, recover Raman spectrum (e.g., without fluorescence and systematic noise) from the at least one received/produced Raman spectrum, and/or quantify and/or identify molecules in material 150 using the recovered Raman spectrograph. Although depicted as outside of spectrometer 110, additionally or alternatively at least part of computer system 190 can be integrated into spectrometer 110. Computing system 190 is described further in relation to FIG. 9.

According to some embodiments, spectrometer 110 offers at least some of the advantages of: differentiating chemical structures (even if they contain the same atoms in different arrangements), physical contact with material 150 not required, no damage to material 150 (e.g., non-destructive testing), preparation of material 150 is not required, material 150 can be in a transparent container (e.g., when light 160 is in the visible or near-visible light spectrum), sensitivity to small changes in material structure (e.g., detection of molecular vibrations is very sensitive to changes in chemistry and structure), analyzing samples in aqueous solutions (e.g., suspensions, biological samples, etc.), and the like.

FIG. 2 illustrates example spectrum 200 produced using system 100 (FIG. 1). A Raman spectrum—a plot/graph of an intensity of the Raman scattering (shifted light) against frequency—can be produced by a computing system 190 using intensity measurements from optical bench 130. Spectrum 200 (and 250A) can reliably be used to identify molecules in material 150. In this way, Raman spectra (e.g., spectra 250A) can be said to produce a "fingerprint" of molecules in material 150. For example, Raman spectra (e.g., spectra 250A) of material 150 can be compared to a database (e.g., in the same or another computing system) of Raman spectra associated with known molecules to identify and quantify molecules in material 150.

Spectrum 200 are plotted/graphed along three axes: intensity 210A, time 220A, and wavelength $\lambda$ (or wavenumber) 230A. As shown in FIG. 2, intensity (axis 210A) can be power (light intensity) in a.u. (arbitrary units of intensity); other units can be milliwatts (mW) or photon count. Time (axis 220A) can be in nanoseconds (ns). Wavelength (axis 230A) can be a Raman shift in units such as nanometers (nm) or as a wavenumber in $cm^{-1}$. System 100 can measure an intensity of Raman scatter having wavelength $\lambda$. For example, measurements taken at three wavelengths $\lambda_1$, $\lambda_2$, and $\lambda_3$ result in measurements $240A_1$, $240A_2$, and $240A_3$, respectively. Measurements $240A_1$, $240A_2$, and $240A3$ show an intensity of Raman scattered light (the light having a particular wavelength $\lambda_1$, $\lambda_2$, and $\lambda_3$) over time. Each of measurements $240A_1$-$240A_3$ can be individually viewed when plotted/graphed along two axes: intensity 210A and time 220A. Measurements $240A_1$-$240A_3$ can be collectively viewed when plotted/graphed along two axes: intensity 210A and wavelength $\lambda$ (or wavenumber) 230A, which results in spectrum 250A (which can be referred to as a Raman spectrum). Spectrum 250A shows the peak intensity of Raman scatter at a range of wavelengths $\lambda$, such as wavelengths $\lambda_1$, $\lambda_2$, and $\lambda_3$ (or wavenumber).

FIG. 3A shows graphical representation (e.g., plot, graph, and the like) 300A of (relative) (received) light intensity or power (e.g., in arbitrary units of intensity (a.u.), in milliwatts (mW), or photon count) along axis 210B over time (e.g., in nanoseconds) along axis 220B. Graphical representation 300A includes Raman signal 310A, fluorescence 320A, and total signal 240B, according to some embodiments. Raman signal 310A is, by way of non-limiting example, an intensity of a particular wavelength of Raman scatter for a material to be measured (e.g., material 150 in FIG. 1). Total signal 240B can have at least some of the characteristics of spectra 240A$_1$-240A$_3$ (FIG. 2) and be an intensity measured by a detector (e.g., optical bench 130 in FIG. 1) from (approximately) time t$_0$ to time t$_4$. In contrast to Raman scattering, fluorescence emission (fluorescence 320A) follows an absorption process. Fluorescence 320A can be several orders of magnitude (e.g., 10$^5$-10$^6$) higher in intensity than Raman signal 310A and can overwhelm or obscure Raman signal 310A, such that Raman signal 310A is difficult to measure.

When light (e.g., light 160 in FIG. 1) from an excitation source (e.g., excitation light source 120 in FIG. 1) illuminates a material to be measured (e.g., material 150 in FIG. 1), receipt of the Raman signal (also called Raman scatter or return signal) 310A by a detector (e.g., detector 136 in FIG. 1) is almost instantaneous (e.g., ≤1 ps, depending on the distance traveled by the light and the Raman signal) (e.g., at time t$_0$). For this reason, Raman signal 310A can also be thought of as (approximately) representing the light from the excitation source, such as a laser pulse. In contrast, fluorescence 320A is received/occurs after Raman signal 310A (e.g., at time t$_1$). When light from the excitation source illuminates the material to be measured (e.g., at time t$_0$), receipt of fluorescence 320A by the detector occurs later (e.g., at time t$_1$, which can be hundreds of nanoseconds or even milliseconds later).

When the detector (e.g., detector 136 in FIG. 1) is active (e.g., measuring light, detecting photons, and the like) while Raman signal 310A is present and before fluorescence 320A obscures/interferes with Raman signal 310A (e.g., from time t$_0$ to time t$_2$), Raman signal 310A can be measured by the detector without being completely overwhelmed or obscured by fluorescence 320A. Time window 330 is ideally narrow (relative to time window 340) and the time during which most (90%-100%) of the Raman photons are present and can be collected, although in practice time window 330 can be broader to include time when Raman photons are not present. For example, time window 330 is as wide (timewise) as a laser pulse from excitation light source 120 (FIG. 1) (e.g., t$_0$-t$_3$). By way of further example, time window 330 is the time during which Raman signal 310A is present (e.g., approximately 80%-100% of peak intensity) and fluorescence 320A is mostly not present (e.g., from time t$_0$ to time t$_2$, time t$_0$ to time t$_3$, and the like) or is present.

As shown in FIG. 3A, although fluorescence 320A begins being received at time t$_1$, an intensity of fluorescence 320A may not be high enough to begin overwhelm or obscure Raman signal 310 until at or after time t$_2$. Control of the detector such that the detector is substantially active only during time window 330 can be referred to as gating. Moreover, time window 330 can also be referred to as gate 330. Gating can be used to reject a significant portion of fluorescence 320A.

In some embodiments, the detector (e.g., detector 136 in FIG. 1) is active (e.g., gate 330 in FIG. 3A begins) prior to the excitation source (e.g., excitation light source 120 in FIG. 1) providing light. By way of non-limiting example, (ideal) gate 330 is 1 ns (1,000 ps). The time resolution of the detector using the 1 ns (ideal) gate 330 is approximately equal to the laser pulse duration (e.g., 600 ps).

Time window 340 is a second time window or gate which is ideally broad/wide (relative to time window 330) and during which Raman photons are ideally not present and not detected, and fluorescence is present. In practice, Raman photons may be present during time window 340. For example, during time window 340, little of Raman signal 310A is present (e.g., 0%-20% of peak intensity).

As shown in FIG. 3A, time window 340 can partially (or completely) overlap with time window 330. Alternatively, time window 330 and time window 340 can be contiguous. In other words, time window 330 and time window 340 occur one after the other sequentially. For example, time window 340 can begin (almost immediately) after time window 330 ends, and can end before the intensity of total signal 240 drops to zero (e.g., at time t$_4$). For example, time window 340 can extend out to time t$_4$. In various embodiments, time window 330 ends and time window 340 begins before or after t$_1$ (or t$_2$). Generally, time window 330 is shorter in duration than time window 340, although time window 330 can be greater-than-or-equal-to time window 340.

The spectrometer (e.g., spectrometer 110) can be controlled such that measurements can be taken during both time window 330 and time window 340 using one pulse (e.g., of light from excitation light source 120). Alternatively or additionally, two pulses (e.g., of light from excitation light source 120), one pulse for measurements in time window 330 and another pulse during time window 340.

Figure 3B:
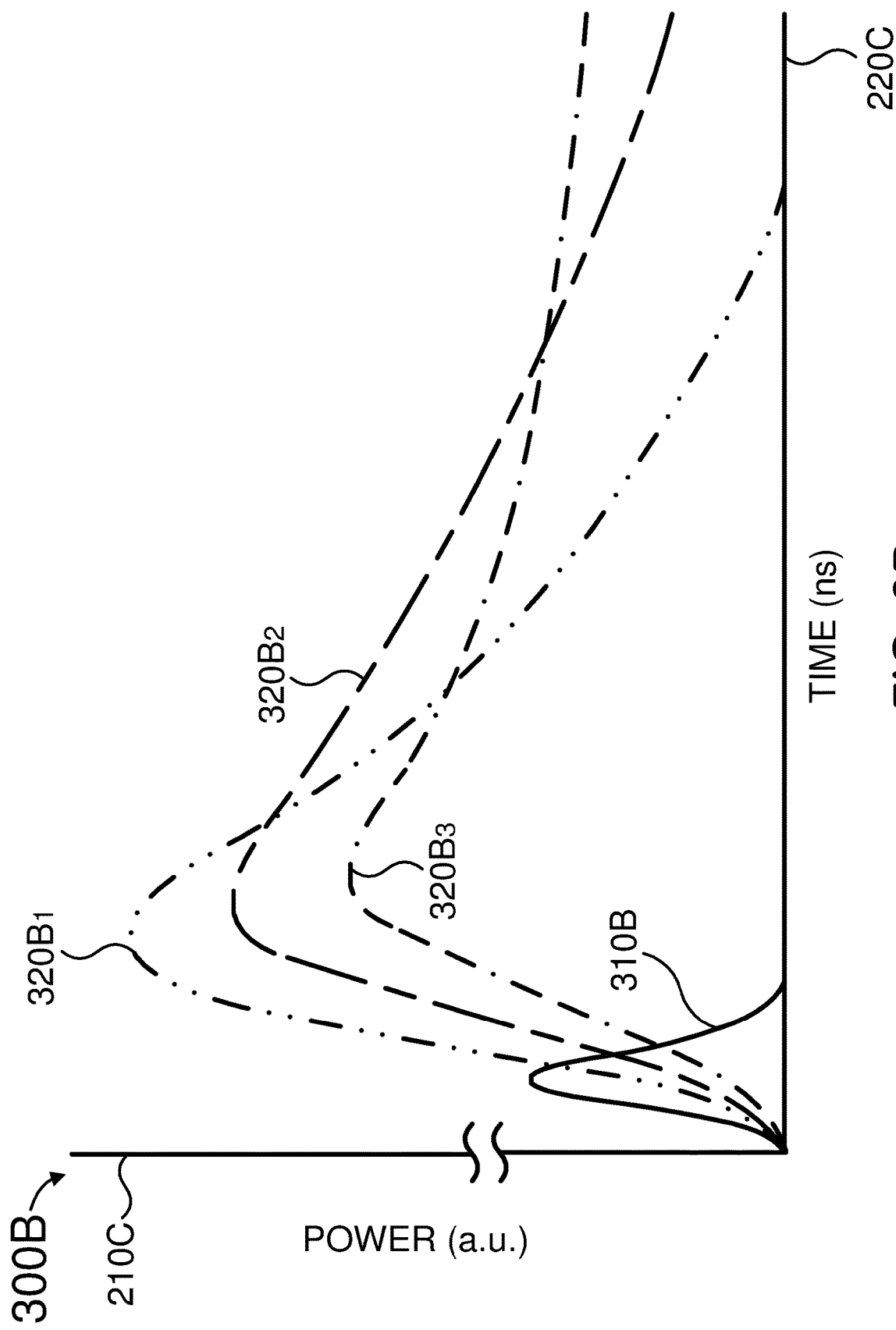

FIG. 3B depicts graphical representation (e.g., plot, graph, and the like) 300B of (relative) (received) light intensity or power (e.g., in arbitrary units of intensity (a.u.), in milliwatts (mW), or photon count) (along axis 210C) over time (e.g., in nanoseconds) along axis 220C from a (e.g., 600 ps) laser pulse, in accordance with some embodiments. Graphical representation 300B can include Raman signal 310B and fluorescence 320B$_1$-320B$_3$. Graphical representation 300B can show relative intensities and/or lifetimes/durations of Raman signal 310B and fluorescence 320B$_1$-320B$_3$. Raman signal 310B has at least some of the characteristics of Raman signal 310A described above in relation to FIG. 3A. Fluorescence 320B$_1$-320B$_3$ can have at least some of the characteristics of fluorescence 320A (FIG. 3A). Since Raman scattering occurs almost immediately (e.g., ≤1 ps, depending on the distance traveled by the light and the Raman signal) after an excitation light pulse from the excitation source (e.g., excitation light source 120 in FIG. 1), Raman signal 310B can also (approximately) represent the excitation light pulse.

Graphical representation 300B illustrates the relative intensities and/or the relative lifetimes/durations among fluorescence 320B$_1$-320B$_3$, according to various embodiments. Raman signal 310B can have at least some of the characteristics of Raman signal 310A (FIG. 3A). Fluorescence 320B$_1$-320B$_3$ can have at least some of the characteristics of fluorescence 320A (FIG. 3A). In some embodiments, fluorescence 320B$_1$-320B$_3$ results when light (e.g., light 160 in FIG. 1) from an excitation source (e.g., excitation light source 120 in FIG. 1) illuminates a material to be measured (e.g., material 150 in FIG. 1), where the wavelength of the light used varies. In other words, fluorescence 320B$_1$-320B$_3$ can be from the same material, but the wavelength of the light used is different.

As shown in FIG. 3B, each of fluorescence 320B$_1$-320B$_3$ can have a different lifetime/duration, with fluorescence 320B$_1$ having the shortest and fluorescence 320B$_3$ having the longest. By way of non-limiting example, fluorescence 320B$_1$ has a 1 ns lifetime/duration, fluorescence 320B2 has a 5 ns lifetime/duration, and fluorescence 320B$_3$ has a 10 ns lifetime/duration. Depending upon the material, a fluorescence can have other lifetimes/durations (e.g., 100 ps-10 ms). As shown in FIG. 11B, the longer the lifetime/duration of a respective one of fluorescence 320B$_1$-320B$_3$, the lower the intensity of a respective one of fluorescence 320B$_1$-320B3 can be. Moreover, the decay rate of fluorescence 320B$_1$-320B$_3$ is different at each frequency.

FIGS. 4A and 4B depict fluorescence, and fluorescence and systematic noise (respectively) in a Raman spectrum. FIG. 4A is a graphical representation (e.g., plot, graph, and the like) 400A of (relative) (received) light intensity or power (e.g., in arbitrary units of intensity (a.u.), in milliwatts (mW), or photon count) along axis $210D_1$ over wavelength (e.g., in nm) (or wavenumber in $cm^{-1}$) along axis $230B_1$, according to some embodiments. Raman signal $410_1$ is, by way of non-limiting example, an intensity of Raman scatter for a material to be measured (e.g., material 150 in FIG. 1). Spectrum $250B_1$ can have at least some of the characteristics of spectrum 250A (FIG. 2). Spectrum $250B_1$ includes Raman signal $410_1$ and fluorescence (e.g., fluorescence 320A (FIG. 3A) and fluorescence $320B_1$-$320B_3$ (FIG. 3B). Although, fluorescence can be can be several orders of magnitude (e.g. $10^5$-$10^6$) higher in intensity than Raman signal $410_1$, Raman signal $410_1$ can still be discerned as peak $420_1$ in spectrum $250B_1$.

FIG. 4B is a graphical representation (e.g., plot, graph, and the like) 400B of (relative) (received) light intensity or power (e.g., in arbitrary units of intensity (a.u.), in milliwatts (mW), or photon count) along axis $210D_2$ over wavelength (e.g., in nm) (or wavenumber in $cm^{-1}$) along axis $230B_2$, according to various embodiments. Raman signal $410_2$ is, by way of non-limiting example, an intensity of Raman scattered light for a material to be measured (e.g., material 150 in FIG. 1). Spectrum $250B_2$ can have at least some of the characteristics of spectrum 250A (FIG. 2). Spectrum $250B_2$ includes Raman signal $410_2$, fluorescence (e.g., fluorescence 320A (FIG. 3A) and fluorescence $320B_1$-$320B_3$ (FIG. 3B)), and systematic noise. Systematic noise arises from components (e.g., etalon, grating, reflector, filter, and the like) of a spectrometer (e.g., spectrometer 110 in FIG. 1) which can have multiple reflections that interfere with each other to produce an interference pattern, creating a periodic fluctuation in the spectrum. In contrast to spectrum $250B_1$, the systematic noise in spectrum $250B_2$ obscures peak $420_2$, which is an indication of Raman signal $410_2$.

Figure 5:
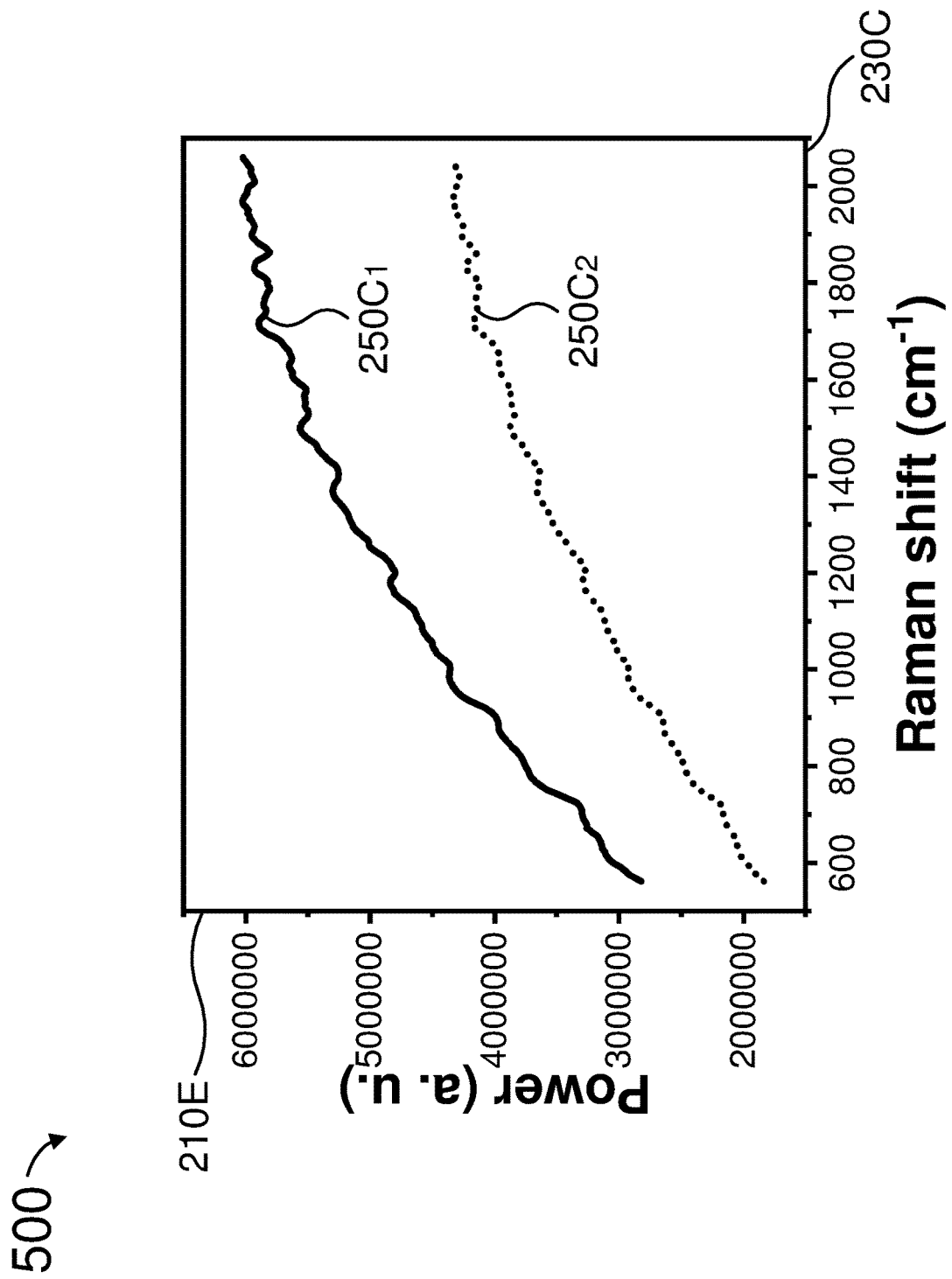
FIG. 5 is a simplified representation of spectra taken during different windows of time, according to some embodiments.

FIG. 5 illustrates graphical representation (e.g., plot, graph, and the like) 500 of (relative) (received) light intensity or power (e.g., in arbitrary units of intensity (a.u.), in milliwatts (mW), or photon count) along axis 210E over wavelength (e.g., in nm) (or wavenumber in $cm^{-1}$) along axis 230C, in accordance with some embodiments. Graphical representation 500 includes spectrum $250C_1$ and spectrum $250C_2$. Spectrum $250C_1$ and spectrum $250C_2$ can have at least some of the characteristics described above for spectrum 250A (FIG. 2), and spectrum $420_1$ and spectrum $420_2$ (FIG. 4).

As shown in FIG. 5, spectrum $250C_1$ and spectrum $250C_2$ go up from left to right, which can generally be ascribed to the change in fluorescence over wavelength, such as described in relation to FIG. 3B. In some embodiments, measurements shown in spectrum $250C_1$ can be made in a time window (or gate) when for the most part a Raman signal is present and fluorescence is not present (e.g., time window 330 in FIG. 3A). Systemic noise (described in relation to FIG. 4) is present in both spectrum $250C_1$ and spectrum $250C_2$. Measurements shown in spectrum $250C_2$ can be made in a time window (or gate) when for the most part a Raman signal is not present and fluorescence is present (e.g., time window 340 in FIG. 3A). Generally, spectrum $250C_2$ can have a lower intensity than spectrum $250C_1$, at a particular wavelength, since the intensity of fluorescence may have decayed by/in time window 340 (FIG. 3A) relative to time window 330.

To reduce systemic noise and fluorescence and to recover a Raman spectrum, measurements made in time window 330 (FIG. 3A) (e.g., spectrum $250C_1$ in FIG. 5) can be divided by measurements made in time window 340 (e.g., spectrum $250C_2$). This calculation relies upon certain assumptions. For example, this calculation assumes that systemic noise is not random. By way of further example, this calculation assumes that the amplitude of systemic noise is linearly proportional to an amplitude of fluorescence (plus Raman signal). In other words, if the amplitude of fluorescence (plus Raman signal) increases by a factor of 10 (at a particular wavelength) from spectrum $250C_2$ to spectrum $250C_1$, then systemic noise increases by a factor of 10 (at that wavelength), as well.

Figure 6A:
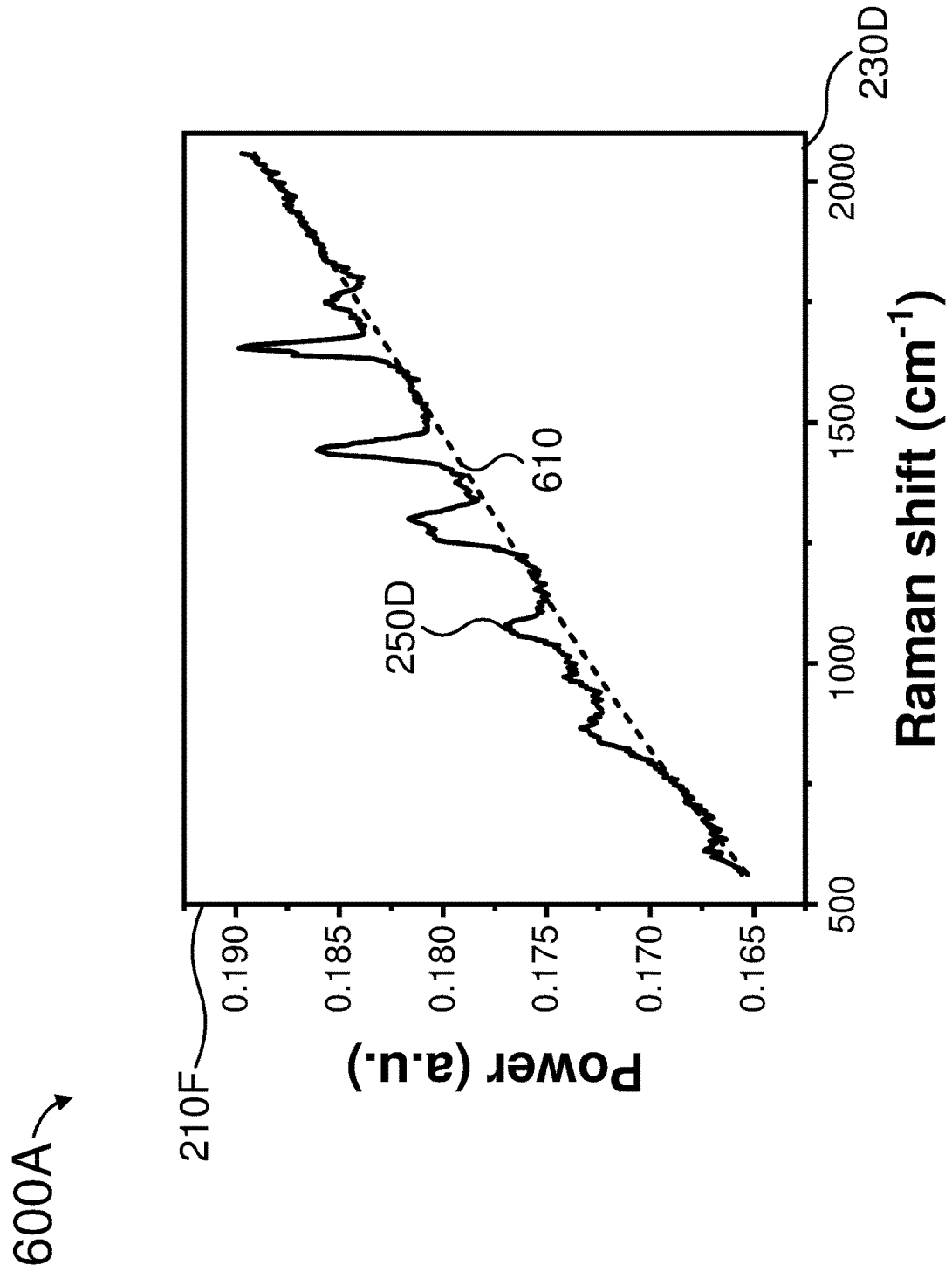

FIGS. 6A and 6B illustrate graphical representations (e.g., plot, graph, and the like) 600A and 600B of (relative) (received) power (light intensity) in a.u. (arbitrary units of intensity) (other units can be milliwatts (mW) or photon count) along axis 210F over wavelength as wavenumber in $cm^{-1}$ (other units can be nm) along axis 230D, in accordance with some embodiments. Graphical representation 500 includes recovered Raman spectrum 250D. For example, recovered Raman spectrum 250D results from dividing spectrum $250C_1$ (FIG. 5) (e.g., measurements made in time window 330 (FIG. 3A) by spectrum $250C_2$ (e.g., measurements made in time window 340 (FIG. 3A)).

As shown in FIG. 6A, recovered Raman spectrum 250D goes up from left to right, which can generally be attributed to the change in fluorescence over wavelength, such as described in relation to FIG. 3B. To minimize this effect (e.g., normalize recovered Raman spectrum 250D), recovered Raman spectrum 250D can optionally be fit to curve 610, and (points along) curve 610 can be subtracted from (corresponding points along) recovered Raman spectrum 250D. Curve 610 can serve as a baseline (and be referred to as a baseline) for recovered Raman spectrum 250D. Curve 610 can be calculated from recovered Raman spectrum 250D, for example, using a simple linear regression (where curve 610 is a straight line), third-order polynomial curve fitting (where curve 610 is a polynomial curve), and the like. For two-dimensional sample points with one independent variable and one dependent variable (e.g., the x- and y-coordinates in a Cartesian coordinate system), a simple linear regression determines a linear function (a non-vertical straight line) that predicts the dependent variable values as a function of the independent variables. Curve fitting constructs a curve (or mathematical function), that has the best fit to a series of data points, possibly subject to constraints. Curve fitting can involve either interpolation (where an exact fit to the data is required) or smoothing (in which a "smooth" function is constructed that approximately fits the data).

FIG. 6B illustrates a normalized recovered Raman spectrum 250E. Normalized recovered Raman spectrum 250E can be computed, for example, by subtracting (points along) curve 610 (FIG. 6A) from (corresponding points along) recovered Raman spectrum 250D.

Figure 7:
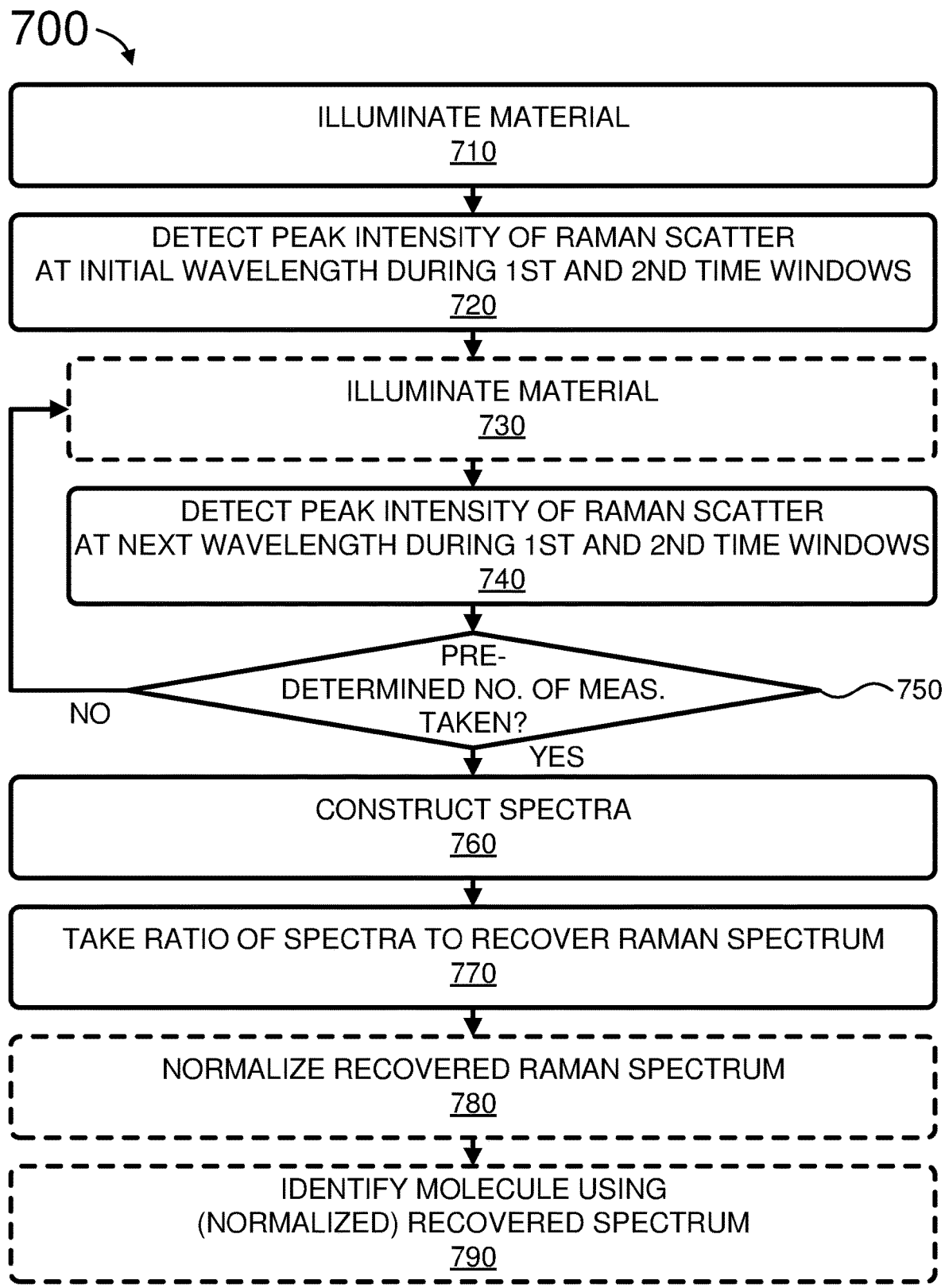
FIG. 7 is a simplified flow diagram of a method for systematic noise reduction in time-gated spectroscopy, in accordance with some embodiments.

FIG. 7 illustrates method 700 for reducing fluorescence and systemic noise in time-gated Raman spectroscopy, according to some embodiments. Method 700 can be performed by spectrometer 110 and computing system 190 (FIG. 1). According to various embodiments, steps 710-750 illuminate a material and measure an intensity of Raman scatter over a range of wavelengths (e.g., $\lambda_0$-$\lambda_{N-1}$). The measurements at each excitation wavelength are taken twice: during a first time window (e.g., during which there is a substantial Raman signal) and a second time window (e.g., during which there is a small amount of Raman signal). A non-limiting example of measurements collectively taken using steps 710-750 can be graphically represented as shown in and described in relation to FIGS. 5.

Method 700 can commence at step 710, where a material can be illuminated. In some embodiments, light such as a laser pulse provided by excitation light source 120 (FIG. 1) is directed at a material. The material can have at least some of the characteristics of material 150 (FIG. 1). For example, a laser pulse is provided to take measurements at a particular wavelength.

At step 720, an (peak) intensity of Raman scatter from the material, fluorescence from the material, and systemic noise from an element in the spectrometer are collectively detected for an initial wavelength during two time windows (gates). For example, measurements are taken during time window 330 and time window 340 (FIG. 3A), separately. In some embodiments, the light hitting the material results in Raman scatter (or Raman signal) and fluorescence. For example, the Raman scatter, fluorescence, and systemic noise (which can arise from an element in spectrometer 110 (FIG. 1)) can be detected by spectrometer 110. By way of further non-limiting example, the detected Raman scatter and fluorescence may appear over time (e.g., when graphed, plotted, and the like) as total signal 240B in graphical representation 300A (FIG. 3A). The measured (peak) intensity of the Raman scatter (e.g., data, graphical representation, and the like) can be stored in spectrometer 110 and/or the computing system 190.

At step 730, the material can be optionally illuminated. In some embodiments, light such as a laser pulse is provided by excitation light source 120 (FIG. 1). For example, a laser pulse is provided for measurements at a particular wavelength or wavelengths. Alternatively or additionally, measurements at step 740 can be made using a different part (e.g., pixels) of a detector (e.g., detector 136 in FIG. 1) using the light from step 710 (hence light at step 730 is optional). In this way, steps 720 and at least some iterations of step 740 can be performed in parallel.

At step 740, an (peak) intensity of Raman scatter from the material, fluorescence from the material, and systemic noise from an element in the spectrometer are collectively detected for an initial wavelength during two time windows (gates). For example, measurements are taken during time window 330 and time window 340 (FIG. 3A), separately. By way of further non-limiting example, the measurements can be represented graphically as shown in FIG. 5.

At step 750, a determination is made as to whether another measurement is to be made. In some embodiments, the predetermined number (N) of measurements to be made is compared to the number of measurements (already) made. When the predetermined number (N) of measurements to be made is less than the number of measurements (already) made, method 700 can proceed to step 730. For example, when N=8 and measurements are only taken for wavelengths $\lambda_0$, $\lambda_1$, $\lambda_2$, $\lambda_3$, $\lambda_4$, and $\lambda_5$, method 700 can proceed to step 730. When the predetermined number (N) of measurements to be made is equal to the number of measurements (already) made, method 700 can proceed to step 760. For example, when N=6 and measurements are already taken for wavelengths $\lambda_0$, $\lambda_1$, $\lambda_2$, $\lambda_3$, $\lambda_4$, and $\lambda_5$, method 700 can proceed to step 760.

At step 760, two spectra can be constructed. For example, the peak intensities (e.g., N measurements) over wavelength measured during time window 330 (FIG. 3A) comprise a first spectra (e.g., graphically depicted as spectrum 250C₁ in FIG. 5). By way of further non-limiting example, the peak intensities (e.g., N measurements) over wavelength measured during time window 340 (FIG. 3A) comprise a second spectra (e.g., graphically depicted as spectrum 250C₂ in FIG. 5).

At step 770, a Raman spectrum of the material can be recovered (e.g., the fluorescence and systematic noise are reduced enough to discern the peaks of Raman scatter) using the two constructed spectra. In some embodiments, the Raman spectrum of the material can be recovered using the first spectra (e.g., peak intensities during a time window 330 (FIG. 3A)) and the second spectra (e.g., peak intensities during time window 340). For example, the first spectra can be divided by the second spectra to produce the recovered Raman spectrum. For example, the recovered Raman spectrum may appear (e.g., when graphed/plotted) as recovered Raman spectrum 250D in FIG. 6.

Optionally at step 780, the recovered Raman spectrum can be normalized. For example, the recovered Raman spectrum (e.g., recovered Raman spectrum 250D in FIG. 6) can be fit to curve 610, and (points along) curve 610 can be subtracted from (corresponding points along) recovered Raman spectrum 250D. This normalization process is described further in relation to FIG. 6.

Optionally at step 790, a molecule can be identified using the recovered Raman spectrum (and/or normalized recovered Raman spectrum). For example, a database of known Raman spectra for certain molecules can be searched using (e.g., compared to) the recovered Raman spectrum (and/or normalized recovered Raman spectrum) to find a match.

By way of further non-limiting example, steps 710-770 can be applied (one or more times) to optical phantoms, each optical phantom having/mimicking a different concentration of a particular molecule of material 150 (FIG. 1). During calibration, the resulting recovered spectrum from each phantom/concentration can be correlated with the molecule (and concentration) of that optical phantom. Using calibration, the correlation between the recovered Raman spectrum of the material and the presence/concentration of a certain molecule can be established. In some embodiments, the spectra generated during the calibration process are stored in a database and the actual Raman spectrum recovered when taking real measurements can be compared to the stored spectra. The characteristics of a matching stored spectrum can be associated with the material.

Figure 8:
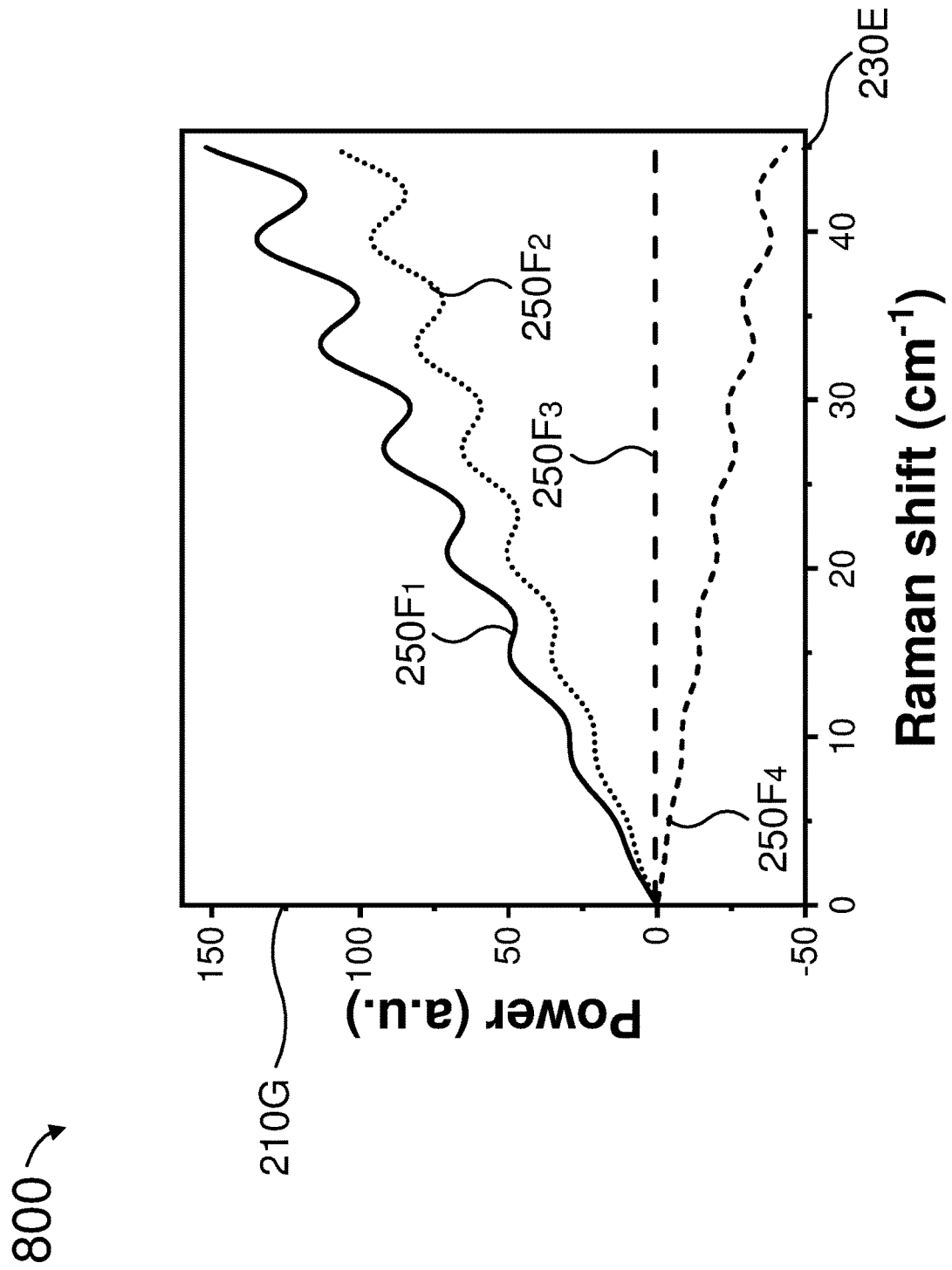
FIG. 8 is a simplified comparison of spectra, in accordance with various embodiments.

FIG. 8 is a graphical representation (e.g., plot, graph, and the like) 800 of (relative) (received) light intensity or power in a.u. (arbitrary units of intensity (other units can be milliwatts (mW) or photon count) along axis 210G over wavelength as wavenumber in $cm^{-1}$ (other units can be nm) along axis 230E, according to some embodiments. For clarity, spectra 250F1 and 250F2 include fluorescence and systematic noise, and do not include Raman scatter. For example, spectrum 250F₁ is from time window 330 (FIG. 3A) and spectrum 250F₁ has at least some of the characteristics of 250C₁. By way of further non-limiting example, spectrum 250F₂ is from time window 340 (FIG. 3A) and spectrum 250F₂ has at least some of the characteristics of 250C₂. Spectrum 250F₃ is spectra 250F₁ divided 250F₂. Accordingly, (in absence of Raman scatter) spectrum 250F₃ is along axis 230E (is at a baseline, because there are no peaks from Raman scatter), which demonstrates that both fluorescence and systematic noise are reduced by taking a ratio. In contrast, spectrum 250F₄ is 250F₂ subtracted from spectra 250F₁, which results in meaningless data. Spectrum 250F₄ demonstrates that not just any arithmetic operation can be used to reduce fluorescence and/or systemic noise.

Moreover, other arithmetic operations cannot merely be substituted for the arithmetic operations of the present technology.

Figure 9:
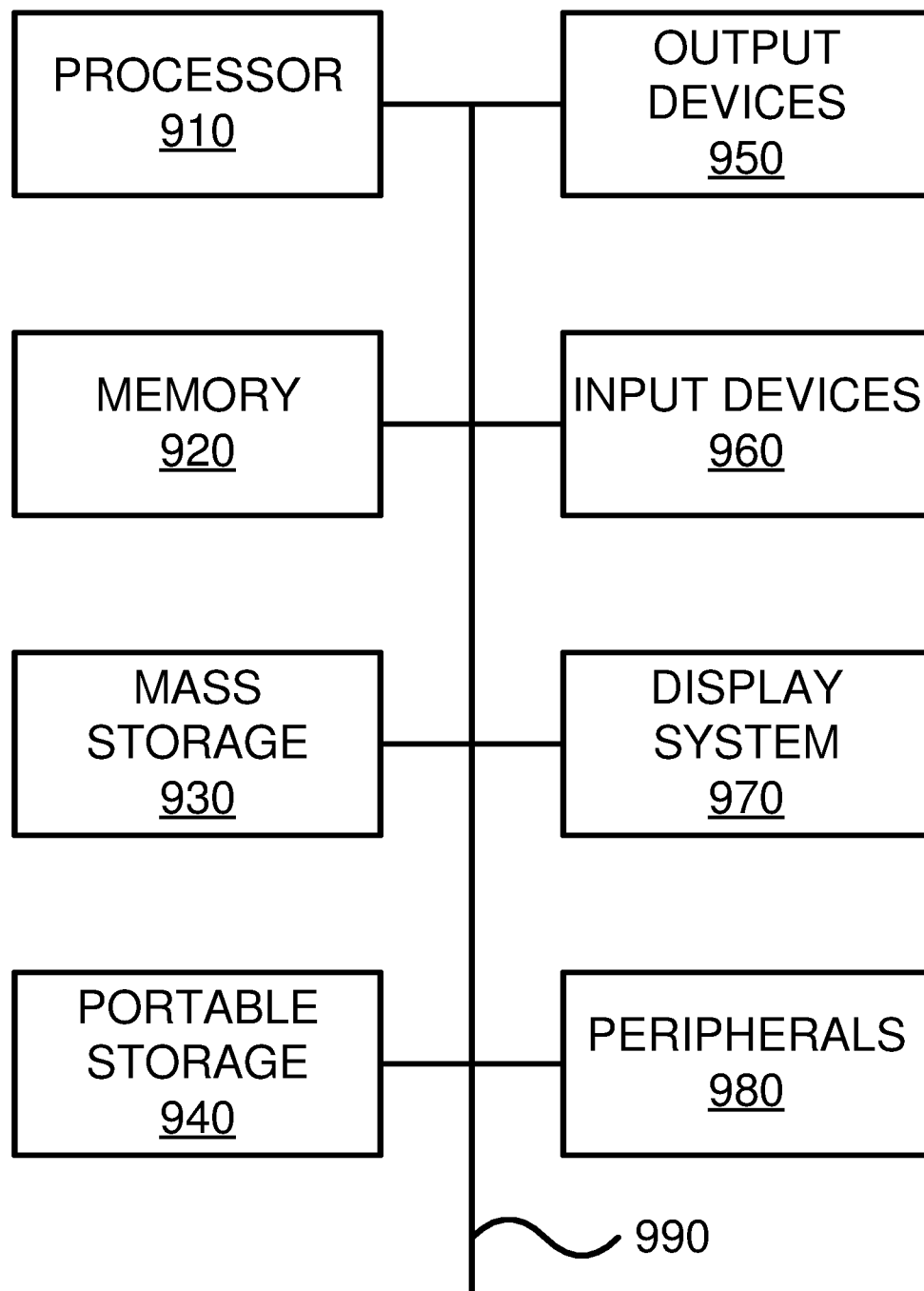
FIG. 9 is a simplified block diagram of a computing system, according to some embodiments.

FIG. 9 illustrates an exemplary computer system (or computing system) 900 that may be used to implement some embodiments of the present invention. The computer system 900 in FIG. 9 may be implemented in the contexts of the likes of computing systems, networks, servers, or combinations thereof. The computer system 900 in FIG. 9 includes processor unit(s) 910 and main memory 920. Main memory 920 stores, in part, instructions and data for execution by processor unit(s) 910. Main memory 920 stores the executable code when in operation, in this example. The computer system 900 in FIG. 9 further includes a mass data storage 930, portable storage device 940, output devices 950, user input devices 960, a graphics display system 970, and peripheral device(s) 980.

The components shown in FIG. 9 are depicted as being connected via a single bus 990. The components may be connected through one or more data transport means. Processor unit(s) 910 and main memory 920 are connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine and/or container operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

The invention claimed is:

1. A method for reducing fluorescence and systemic noise in time-gated spectroscopy, the method comprising:
   providing first light using an excitation light source;
   receiving, by a detector, first scattered light from a material responsive to the first light during a first time window having a first duration, the first scattered light having substantial Raman signal, the first scattered light having a first wavelength;
   detecting a peak intensity of the first scattered light;
   receiving, by the detector, second scattered light from the material responsive to the first light during a second time window having a second duration, the second scattered light having little Raman signal, the second scattered light having the first wavelength;
   detecting a peak intensity of the second scattered light;
   providing second light using the excitation light source;
   receiving, by the detector, third scattered light from the material responsive to the second light during a third time window having the first duration, the third scattered light having substantial Raman signal, the third scattered light having a second wavelength;

detecting a peak intensity of the third scattered light;

receiving, by the detector, fourth scattered light from the material responsive to the second light during a fourth time window having the second duration, the fourth scattered light having little Raman signal, the fourth scattered light having the second wavelength;

detecting a peak intensity of the fourth scattered light;

recovering a spectrum of the material by taking a ratio of the peak intensity of the first scattered light and the peak intensity of the second scattered light, and taking a ratio of the peak intensity of the third scattered light and the peak intensity of the fourth scattered light; and identifying at least one molecule of the material.

2. The method of claim 1 further comprising:

providing third light using the excitation light source;

receiving, by the detector, fifth scattered light from the material responsive to the third light during a fifth time window having the first duration, the fifth scattered light having substantial Raman signal, the fifth scattered light having a third wavelength;

detecting a peak intensity of the fifth scattered light;

receiving, by the detector, sixth scattered light from the material responsive to the third light during a sixth time window having the second duration, the sixth scattered light having little Raman signal, the sixth scattered light having the third wavelength; and detecting a peak intensity of the sixth scattered light;

wherein the recovering the spectrum of the material further includes taking a ratio of the peak intensity of the fifth scattered light and the peak intensity of the sixth scattered light.

3. The method of claim 1, further comprising:

normalizing the recovered spectrum to produce a normalized recovered spectrum; and identifying at least one molecule of the material using the normalized recovered spectrum and a database of identified spectra.

4. The method of claim 3, wherein normalizing the recovered spectrum includes:

fitting the recovered spectrum to a baseline using at least one of linear regression and polynomial curve fitting; and subtracting the baseline from the recovered spectrum to produce the normalized recovered spectrum.

5. The method of claim 1, wherein the substantial Raman signal is 80%-100% of peak intensity of a respective Raman signal.

6. The method of claim 5, wherein the little Raman signal is 0%-20% of peak intensity of the respective Raman signal.

7. The method of claim 1, wherein:

the first duration is shorter than the second duration;

the second time window begins after the first time window ends; and the fourth time window begins after the third time window ends.

8. The method of claim 1, wherein the detector is at least one of a single-photon avalanche diode (SPAD), microchannel plate (MCP), photomultiplier tube (PMT), silicon photomultiplier (SiPM), and avalanche photodiode (APD), and the detector is disposed on at least one of a scanning motor driven rail, SPAD array, and an intensified CCD (ICCD).

9. The method of claim 1, wherein the systemic noise arises from spectrometer components producing multiple reflections that interfere with each other to generate an interference pattern.

10. The method of claim 1, wherein the material has a strong fluorescence background.

11. A system for reducing fluorescence and systemic noise in time-gated spectroscopy, the system comprising:

a processor; and a memory, the memory communicatively coupled to the processor and storing instructions executable by the processor to perform a method, the method comprising:

providing first light using an excitation light source;

receiving, by a detector, first scattered light from a material responsive to the first light during a first time window having a first duration, the first scattered light having substantial Raman signal, the first scattered light having a first wavelength;

detecting a peak intensity of the first scattered light;

receiving, by the detector, second scattered light from the material responsive to the first light during a second time window having a second duration, the second scattered light having little Raman signal, the second scattered light having the first wavelength;

detecting a peak intensity of the second scattered light;

providing second light using the excitation light source;

receiving, by the detector, third scattered light from the material responsive to the second light during a third time window having the first duration, the third scattered light having substantial Raman signal, the third scattered light having a second wavelength;

detecting a peak intensity of the third scattered light;

receiving, by the detector, fourth scattered light from the material responsive to the second light during a fourth time window having the second duration, the fourth scattered light having little Raman signal, the fourth scattered light having the second wavelength;

detecting a peak intensity of the fourth scattered light;

recovering a spectrum of the material by taking a ratio of the peak intensity of the first scattered light and the peak intensity of the second scattered light, and taking a ratio of the peak intensity of the third scattered light and the peak intensity of the fourth scattered light; and identifying at least one molecule of the material.

12. The system of claim 11, wherein the method further comprises:

providing third light using the excitation light source;

receiving, by the detector, fifth scattered light from the material responsive to the third light during a fifth time window having the first duration, the fifth scattered light having substantial Raman signal, the fifth scattered light having a third wavelength;

detecting a peak intensity of the fifth scattered light;

receiving, by the detector, sixth scattered light from the material responsive to the third light during a sixth time window having the second duration, the sixth scattered light having little Raman signal, the sixth scattered light having the third wavelength; and detecting a peak intensity of the sixth scattered light;

wherein the recovering the spectrum of the material further includes taking a ratio of the peak intensity of the fifth scattered light and the peak intensity of the sixth scattered light.

13. The system of claim 11, wherein the method further comprises:

normalizing the recovered spectrum to produce a normalized recovered spectrum; and identifying at least one molecule of the material using the normalized recovered spectrum and a database of identified spectra.

14. The system of claim 13, wherein normalizing the recovered spectrum includes:

fitting the recovered spectrum to a baseline using at least one of linear regression and polynomial curve fitting; and subtracting the baseline from the recovered spectrum to produce the normalized recovered spectrum.

15. The system of claim 11, wherein the substantial Raman signal is 80%-100% of peak intensity of a respective Raman signal.

16. The system of claim 15, wherein the little Raman signal is 0%-20% of peak intensity of the respective Raman signal.

17. The system of claim 11, wherein:

the first duration is shorter than the second duration;

the second time window begins after the first time window ends; and the fourth time window begins after the third time window ends.

18. The system of claim 11, wherein the detector is at least one of a single-photon avalanche diode (SPAD), microchannel plate (MCP), photomultiplier tube (PMT), silicon photomultiplier (SiPM), and avalanche photodiode (APD), and the detector is disposed on at least one of a scanning motor driven rail, SPAD array, and an intensified CCD (ICCD).

19. The system of claim 11, wherein the systemic noise arises from spectrometer components producing multiple reflections that interfere with each other to generate an interference pattern.

20. A system for reducing fluorescence and systemic noise in time-gated spectroscopy, the system comprising:

means for providing first light using an excitation light source;

receiving, by a detector, first scattered light from a material responsive to the first light during a first time window having a first duration, the first scattered light having substantial Raman signal, the first scattered light having a first wavelength;

means for detecting a peak intensity of the first scattered light;

means for receiving, by the detector, second scattered light from the material responsive to the first light during a second time window having a second duration, the second scattered light having little Raman signal, the second scattered light having the first wavelength;

means for detecting a peak intensity of the second scattered light;

means for providing second light using the excitation light source;

means for receiving, by the detector, third scattered light from the material responsive to the second light during a third time window having the first duration, the third scattered light having substantial Raman signal, the third scattered light having a second wavelength;

means for detecting a peak intensity of the third scattered light;

means for receiving, by the detector, fourth scattered light from the material responsive to the second light during a fourth time window having the second duration, the fourth scattered light having little Raman signal, the fourth scattered light having the second wavelength;

means for detecting a peak intensity of the fourth scattered light;

means for recovering a spectrum of the material by taking a ratio of the peak intensity of the first scattered light and the peak intensity of the second scattered light, and taking a ratio of the peak intensity of the third scattered light and the peak intensity of the fourth scattered light; and means for identifying at least one molecule of the material.

\* \* \* \* \*